United States Patent [19]

Hirokawa et al.

[11] Patent Number: 4,827,512
[45] Date of Patent: May 2, 1989

[54] PROGRAMMABLE PORTABLE ELECTRONIC DEVICE

[75] Inventors: Katsuhisa Hirokawa, Yokosuka; Yasuo Iijima, Yokohama, both of Japan

[73] Assignee: Kabushiki Kaisha Toshiba, Kawasaki, Japan

[21] Appl. No.: 915,514

[22] Filed: Oct. 6, 1986

[30] Foreign Application Priority Data

Oct. 7, 1985 [JP] Japan .................. 60-223112
May 19, 1986 [JP] Japan .................. 61-114151
Jun. 26, 1986 [JP] Japan .................. 61-150432

[51] Int. Cl.$^4$ ............................ H04L 9/00; G06K 5/0
[52] U.S. Cl. ...................... 380/23; 380/24; 380/25; 235/380; 235/487
[58] Field of Search .................. 380/4, 23, 25, 50, 24; 235/380, 382, 382.5, 487

[56] References Cited

U.S. PATENT DOCUMENTS

| | | | |
|---|---|---|---|
| 4,204,113 | 5/1980 | Giraud et al. ........................ | 380/24 |
| 4,224,666 | 9/1980 | Giraud .................... | 380/23 |
| 4,259,955 | 3/1981 | Giraud et al. ........................ | 380/23 |
| 4,409,434 | 10/1983 | Basset et al. ........................ | 380/50 |
| 4,453,074 | 1/1984 | Weinstein ............................. | 380/23 |
| 4,549,075 | 10/1985 | Saada et al. ........................ | 380/23 |
| 4,572,946 | 2/1986 | Schrenk ............................. | 235/380 |
| 4,609,777 | 9/1986 | Cargile ............................. | 380/23 |
| 4,634,807 | 1/1987 | Chorley et al. ........................ | 380/4 |
| 4,638,120 | 1/1987 | Herve ............................. | 380/23 |
| 4,650,975 | 3/1987 | Kitchner ............................. | 380/23 |
| 4,656,474 | 4/1987 | Mollier et al. ........................ | 380/23 |
| 4,658,093 | 4/1987 | Hellman ............................. | 380/25 |
| 4,683,372 | 7/1987 | Matsumoto ........................ | 235/380 |
| 4,683,553 | 7/1987 | Molier ............................. | 380/25 |
| 4,710,613 | 12/1987 | Shigenaga ............................. | 380/25 |
| 4,736,094 | 4/1988 | Yoshida ............................. | 235/380 |
| 4,742,215 | 5/1988 | Paughters et al. .................. | 235/487 |
| 4,757,533 | 7/1988 | Allen et al. ........................ | 380/25 |
| 4,757,543 | 7/1988 | Tamada et al. ........................ | 380/24 |
| 4,771,460 | 9/1988 | Tamada et al. ........................ | 380/24 |

FOREIGN PATENT DOCUMENTS

| | | |
|---|---|---|
| 0057602 | 8/1982 | European Pat. Off. . |
| 0089876 | 9/1983 | European Pat. Off. . |
| 0152024 | 8/1985 | European Pat. Off. . |
| 0157303 | 10/1985 | European Pat. Off. ............... 380/4 |
| 60-160492 | 8/1985 | Japan ................................... 235/487 |
| 60-153582 | 8/1985 | Japan ................................... 235/487 |
| 60-176186 | 9/1985 | Japan ................................... 235/487 |
| 61-241888 | 10/1986 | Japan ................................... 235/487 |

OTHER PUBLICATIONS

Japanese Abstracts, vol. 9, No. 329, Dec. 24, 1985.
Processors Sharing and Partitioning of Main Storage in the MP System, Sutton et al., IBM Technical Disclosure Bulletin, vol. 22, No. 5, Oct. 1979.
Iijima, U.S. Ser. No. 934,848, filed 11/25/86.
Iijima, U.S. Ser. No. 919,243, filed 10/15/86.
Iijima, U.S. Ser. No. 922,466, filed 10/23/86.
Iijima, U.S. Ser No. 922,465, filed 10/23/86.
Iijima, U.S. Ser. No. 1,252, filed 1/7/87.

*Primary Examiner*—Salvatore Cangialosi
*Attorney, Agent, or Firm*—Cushman, Darby & Cushman

[57] ABSTRACT

According to a portable medium (IC card) of this invention, a memory area is divided into a system program area and a user program area. A text transmitted between the IC card and a host system connected thereto includes a command text and a response text. The command or response text includes a flag indicating that the text is written in the user program area or the system program area. The memory area has a conversion table for a function code and the start address of a program corresponding to the function code. The conversion table is looked up using the given function code as a parameter, thereby obtaining the start address of the corresponding program. The memory area has a correspondence table between a newly added function code and the start address of an added function program. The added function program is selectively executed.

8 Claims, 14 Drawing Sheets

F I G. 1
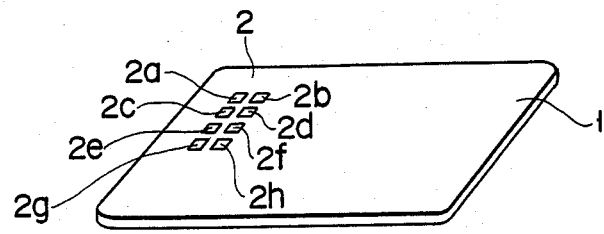
F I G. 2
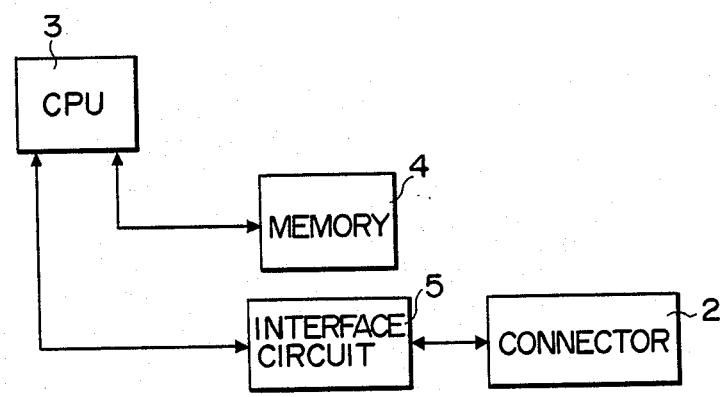
F I G. 3
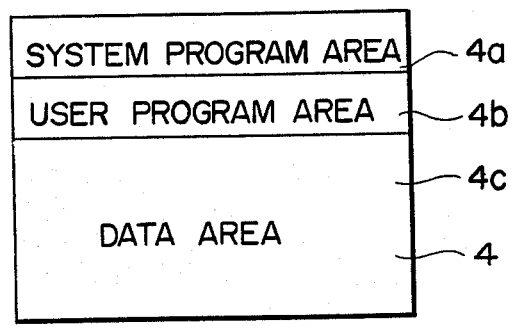

F I G. 10
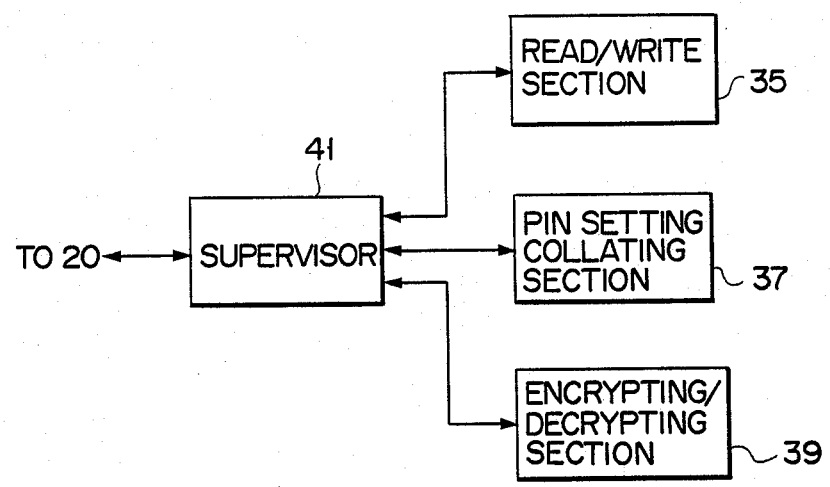
F I G. 11
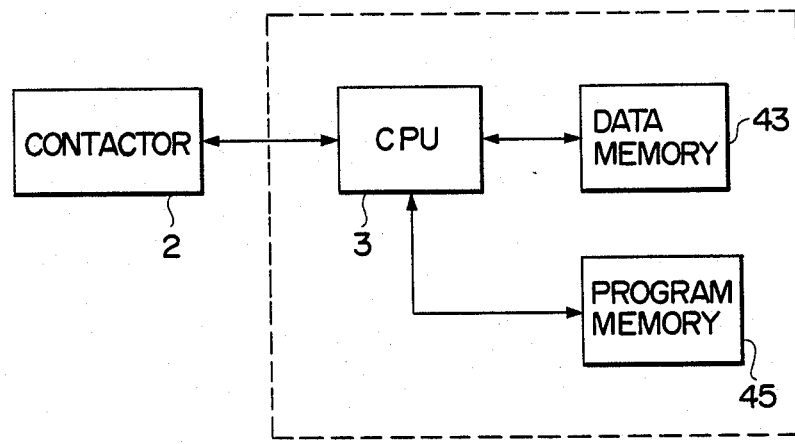

FIG. 14A

FUNCTION CODE  START ADDRESS OF FUNCTION PROGRAM

| A | a a a |
|---|-------|
| B | b b b |
| C | c c c |
| D | d d d |
|   |       |
|   |       |
| Z | z z z |

FIG. 14B

FUNCTION CODE  START ADDRESS OF FUNCTION PROGRAM

| A | a a a |
|---|-------|
| B | b b b |
| D | c c c |
| C | d d d |
|   |       |
|   |       |
| Z | z z z |

F I G. 16A  | FUNCTION CODE |
F I G. 16B  | FUNCTION CODE | DATA |
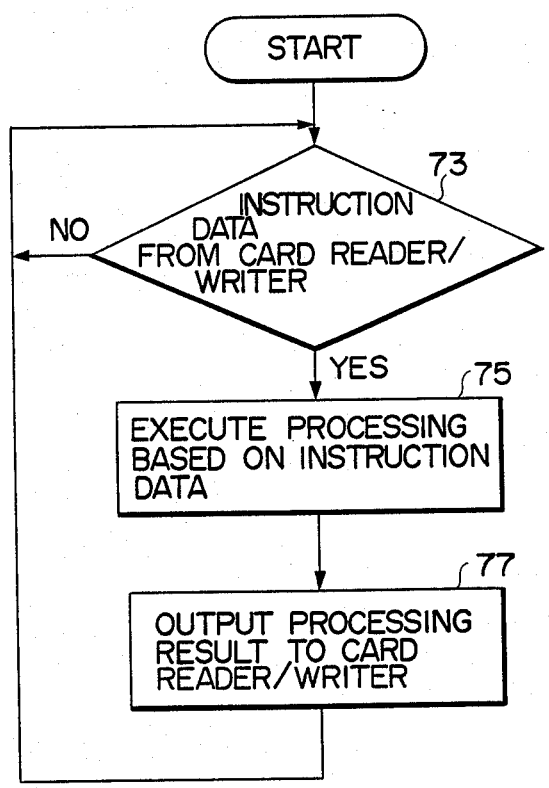
F I G. 17

PROGRAMMABLE PORTABLE ELECTRONIC DEVICE

BACKGROUND OF THE INVENTION

The present invention relates to a portable electronic device, such as a so-called IC card, which incorporates an IC (integrated circuit) chip having a nonvolatile data memory and a control element, such as a CPU (Central Processing Unit).

In recent years, an IC card incorporating an IC chip having a nonvolatile data memory and a control element such as a CPU has been developed as a new portable data storage medium. The IC card reads, writes, or erases data with respect to the incorporated data memory by the internal control element. The control element normally performs a control operation by means of an internal control program. More specifically, when instruction data is input from an external device, the control element executes a decrypting program in the control program, and searches and executes a function program corresponding to the input instruction data. Thereafter, the control element outputs the result as response data to the external device.

In the conventional IC card, the function program is stored in a program memory comprising a mask ROM in or outside the control element. For this reason, if the function program for decrypting data is stored in the IC card, the encrypting method cannot be modified. When individual encrypting methods are to be adopted in accordance with demands of users, a control program for each different demand must be incorporated in the IC card, thus interfering with mass production. In this case, the user must present an encrypting method to a card manufacturer. Therefore, strong demand has arisen for a technique for storing and executing a new function program in addition to the already stored function program.

SUMMARY OF THE INVENTION

It is an object of the present invention to provide a portable electronic device which can store and execute a new function program in addition to the already stored function programs.

In order to achieve the above object of the present invention, there is provided a portable electronic device comprising:

a control central processing unit;

first memory means having a first storage area for storing a control program for a function which is provided during a manufacturing process and is used commonly for various applications, and a second storage area for storing a control program for a function added individually;

second memory means for storing data; and a contact section for receiving power from an operating power source for the portable electronic device from an external device and performing data input/output operation with the external device.

According to the present invention, the user can set an additional function in an IC card while the common function of the IC card will not be inadvertently modified. Therefore, testing and the like can be performed freely in the designing and development of IC card application systems.

In addition, a function program which is formed by the user himself can be stored in a program memory from an external device, and can be executed by a normal sequence. Therefore, a program having an algorithm unique to each application can be registered, and mass production of the IC card is facilitated.

BRIEF DESCRIPTION OF THE DRAWINGS

Other objects and features of the present invention will be apparent from the following description taken in connection with the accompanying drawings in which:

FIG. 1 is a perspective view of an IC card according to an embodiment of the present invention;

FIG. 2 is a block diagram of an electric circuit of the IC card shown in FIG. 1;

FIG. 3 is a schematic format of a memory shown in FIG. 2;

FIG. 10 is a function block of the IC card according to another embodiment of the present invention;

FIG. 11 is a block diagram showing the arrangement of the IC chip incorporated in the IC card;

FIGS. 14A and 14B are tables showing correspondences between function codes and start addresses of the function programs;

FIGS. 16A and 16B are formats of instruction data output from the card reader/writer to the IC card;

FIGS. 17 and 18 are flow charts for explaining the operation of the IC card;

DETAILED DESCRIPTION OF THE PREFERRED EMBODIMENTS

Figure 4:
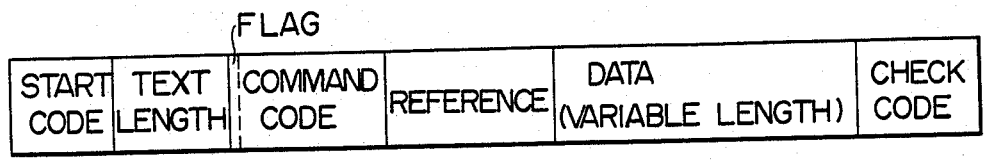
FIG. 4 is a format of a command text used in the IC card of the present invention.

An embodiment of the present invention will be described hereinafter with reference to FIGS. 1 through 9.

Referring to FIG. 1, reference numeral 1 denotes an IC card as a portable medium. Connector section 2 is arranged on the surface of IC card 1 and comprises, e.g., a plurality of terminals 2a through 2h. Terminal 2a is a power source voltage (+5 V) terminal for operation; 2b, a ground terminal; 2c, a clock signal terminal; 2d, a reset signal terminal; 2e through 2g, data input/output terminals; and 2h, a write power source voltage (+21 V) terminal.

IC card 1 comprises control CPU (Central Processing Unit) 3 data memory 4 comprising a PROM, for storing a control program, an identification number (e.g., 4 digits), and data, and interface circuit 5, as shown in FIG. 2. The respective sections are constituted by IC chips and are arranged on a single substrate. Interface circuit 5 is connected to connector section 2 through wiring.

Data memory 4 comprises system program area (first storing area) 4a, user program area (second storing area) 4b, and data area 4c. System program area 4a stores common processing functions for various users, e.g., an input/output function to data area 4c, an arithmetic operation function, an input/output function to user program area 4b, and the like, as shown in FIG. 3. The common processing functions are prestored during the manufacture of the IC card. User program area 4b stores a user addition function, e.g., a user definition function. The user addition function is stored in area 4b under the control of the control program stored in area 4a, and is executed in response to an execution request from external equipment (terminal device) under the control of the control program. The user addition function is additionally stored when it is used.

A command text in CPU 3 consists of a start code, a text length, a command code, a reference, data (variable length), and a check code (a check sum code or a value obtained by exclusively ORing respective data), as shown in FIG. 4. For example, an addition mode command consists of a code indicating addition of a command (command code), a code from the next time (reference), i.e., a code corresponding to an object program added by this command code, and an object program (data).

Figure 5:
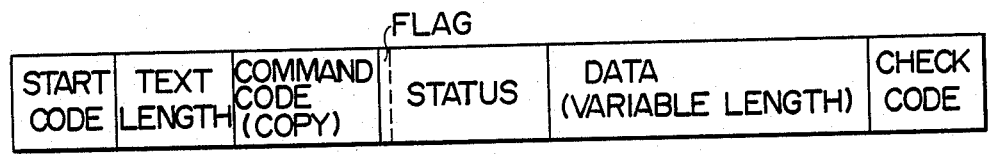
FIG. 5 is a format of a response text used in the IC card of the present invention.

A response text consists of a start code, a text length, a command code (copy), a status (processing result, e.g., "write operation is completed"), data (variable length), and a check code (a check sum code or a value obtained by exclusively ORing text data), as shown in FIG. 5. The command and response texts have different text formats in accordance with whether they are written in area 4a or 4b. For example, in the case of the command text, when the first bit (MSB or LSB) of the command code is "1", this represents that the text is written in area 4b, and when it is "0", this represents that the text is written in area 4a. Meanwhile, when the first bit of the status code for the response text is "1", this represents that the text is written in area 4b, and when it is "0", this represents that the text is written in area 4a.

Figure 6:
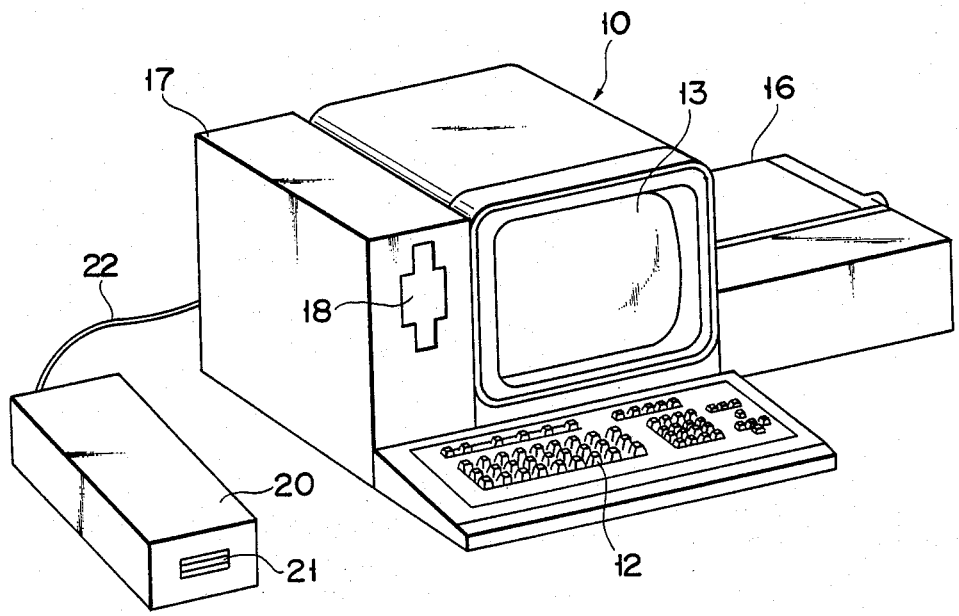
FIG. 6 is a perspective view of a host system connected to the IC card of the present invention.
Figure 7:
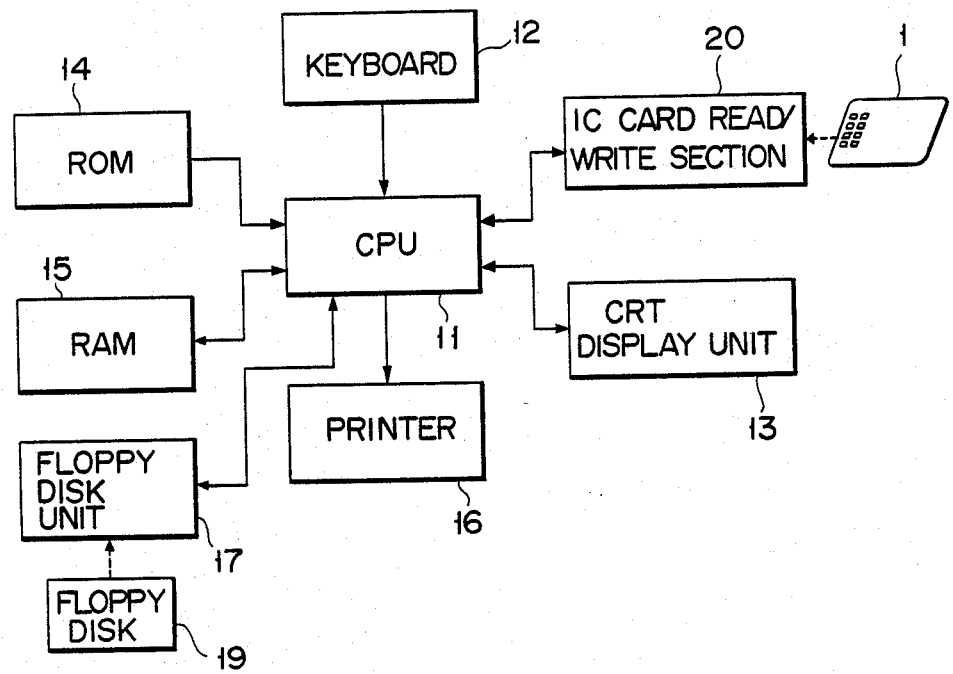
FIG. 7 is a block diagram showing the arrangement of the host system shown in FIG. 6.

FIGS. 6 and 7 show the arrangement of IC card manipulator 10 as a terminal according to the present invention. More specifically, reference numeral 11 denotes a CPU (Central Processing Unit); 12, a keyboard for inputting data; 13, a CRT display unit; 14, a ROM (Read-Only Memory) storing a control program; 15, a RAM (Random Access Memory) for storing data; 16, a dot printer for outputting various print data; 17, a floppy disk unit for storing/reproducing data in/from floppy disk 19 inserted from floppy disk insertion port 18; and 20, an IC card read/write section for reading data in a memory in IC card 1 inserted from card insertion port 21 or writing data into the memory.

Figure 8:
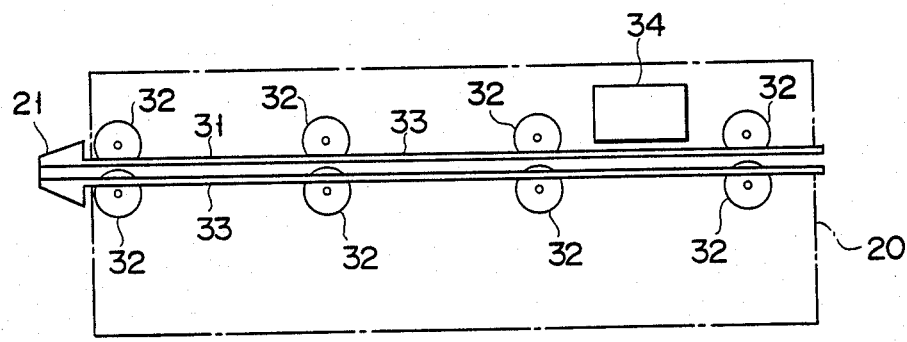
FIG. 8 is a sectional view of an IC card read/write section shown in FIG. 7.

Card read/write section 20 is connected to card manipulator 10 through cable 22. More specifically, as shown in FIG. 8, section 20 has convey path 31 for conveying IC card 1 inserted from card insertion port 21. A plurality of pairs of convey rollers 32 are arranged along path 31 to vertically sandwich IC card 1 when it is conveyed. The pairs of convey rollers 32 are provided at equal intervals along path 31. A distance from the center of each convey roller 32 to the center of an adjacent convey roller 32 corresponds to a width of card 1 in the convey direction. Therefore, path 31 for IC card 1 is defined by convey guide 33. Reader/writer 34 for performing data communication with CPU 3 of card 1 is arranged above guide 33. Reader/writer 34 is electrically connected to connector section 2.

Figure 9:
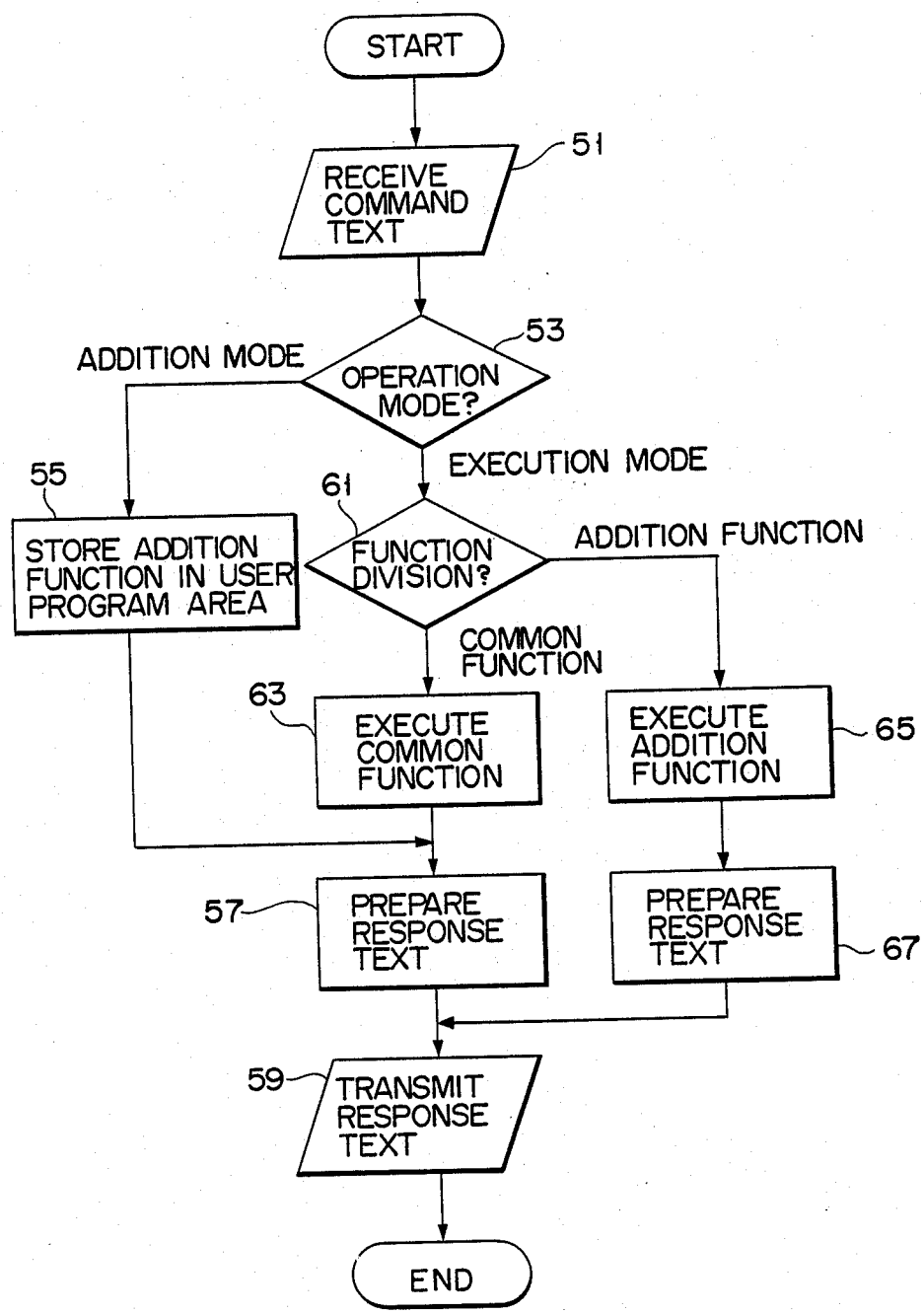
FIG. 9 is a flow chart for explaining the operation of the IC card according to the embodiment of the present invention.

The operation of this embodiment will now be described with reference to the flow chart shown in FIG. 9. First, a case will be described wherein a command is added when the IC card is used. More specifically, a user sets an addition mode by keyboard 12 of IC card manipulator 10, and inputs an addition command, i.e., an object program or parameter defining a user definition function. Then, the user inserts his IC card 1 in card insertion port 21. IC card 1 is then electrically connected to reader/writer 34 through connector section 2. CPU 11 supplies to CPU 3 through connector section 2 and interface circuit 5, a command text for the user, i.e., a code indicating addition of a command (command code), a code from the next time (reference), i.e., a code corresponding to an object program to be added by the addition command, an object program or parameter (data) for defining a user definition function, and user flag "1". As a result, CPU 3 receives the text (step 51), and judges if the mode data input from keyboard 12 represents the addition or execution mode (step 53). If CPU 3 detects the addition mode, it checks in accordance with the text if the command is stored in area 4a. This is to prevent storage of an identical function program in both areas 4a and 4b. If it is determined that the text is not stored in area 4a, the object program is stored in area 4b of memory 4 (step 55). Thereafter, if the write operation is completed, i.e., if the object program can be written in empty area 4b, CPU 3 writes this status (the processing result indicating the completion of the write operation) in the status field, and prepares a response text including user flag "1" (step 57). CPU 3 then outputs this text to CPU 11 (step 59). If the write operation is disabled due to, e.g., double registration, CPU 3 prepares a response text which indicates this status and includes user flag "1" (step 57), and outputs this text to CPU 11 (step 59). CPU 11 confirms storage of the addition command by means of this test. Since double registration of the command is inhibited, two processing operations will not be executed by a single command.

A case will be described wherein the user executes actual processing using IC card manipulator 10. More specifically, the user sets a processing mode using keyboard 12 of manipulator 10 and inputs a processing content. Then, the user inserts his IC card 1 in IC card insertion port 21.

IC card 1 is then electrically connected to reader/writer 34 through connector section 2. When the processing content represents the execution mode, CPU 11 supplies to CPU 3, through connector section 2 and interface circuit 5, a command text for the system consisting of, e.g., a code indicating data input/output to data area 4c (command code), a storing address (reference), storing data (data), and user flag "0". When the processing content represents the addition function, CPU 11 sends to CPU 3, through connector section 2 and interface circuit 5, a command text for the user consisting of, e.g., a code indicating data input/output to data area 4c (command code), a storing address (reference), storing data (data), and user flag "1". CPU 3 receives these texts (step 51), and judges if the execution or addition mode is set (step 53). If the execution mode is detected, CPU 3 checks in accordance with the text if the common or addition function is set (step 61). As a result, if the common function is detected, CPU 3 stores the data in data area 4c of memory 4 (step 63). Thereafter, CPU 3 writes the status indicating the completion of the write operation in the corresponding area of a response text, and prepares the response text including user flag "0" (step 57). CPU 3 then transmits the response text to CPU 11 (step 59). CPU 11 checks storage of the data using this text. If the addition function is detected in step 61, CPU 3 executes the addition function (step 65). Thereafter, CPU 3 checks the status corresponding to execution of the addition function, and prepares a response text including user flag "1"(step 67). Then, CPU 3 outputs this text to CPU 11 (step 59), and CPU 11 checks execution of the addition function.

Another embodiment of the present invention will now be described with reference to FIGS.10 through 18.

IC card 1 is held by a user and is used for collating a personal identification number and accumulating necessary data. As shown in FIG. 10, IC card 1 comprises sections for executing basic functions, i.e., read/write section 35, PIN setting/collating section 37, encrypting-/decrypting section 39, and supervisor 41 for managing these basic functions. Read/write section 35 is a function block for reading, writing, and erasing data with card reader/writer 20. PIN setting/collating section 37 is a function block for executing read/write inhibition processing of a personal identification number set by the user and for collating the identification number after it is set to give permission for the following processing. Encrypting/decrypting section 39 is a function block for encrypting communication data when data is transmitted from CPU 11 to another terminal device to protect it from being disclosed to or modified by a third party and for decrypting encrypted data. Section 39 executes processing in accordance with an encryption algorithm having a sufficient encryption strength, e.g., DES (Data Encryption Standard). Supervisor 41 is a function block for decoding a function code with or without data input from reader/writer 20, and for selecting a necessary function from the basic functions to execute it.

Figure 12:
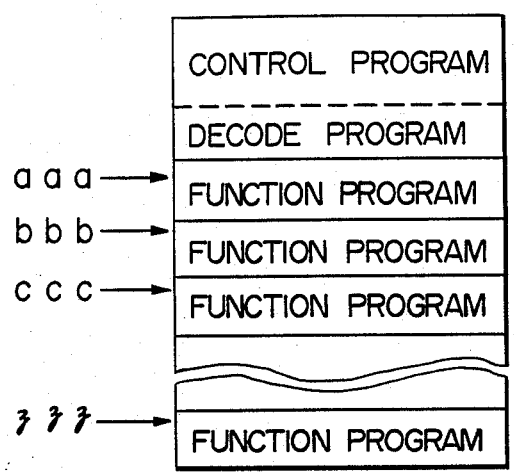
FIG. 12 is a format of a program memory.

In order to effect these functions, IC card 1 comprises CPU 3, nonvolatile data memory 43 which can erase its storage content, program memory 45, and contact section 2 for obtaining electrical contact with card reader/writer 20, as shown FIG. 11. Among these, sections enclosed by the broken lines (CPU 3, data memory 43, and program memory 45) are formed in an IC chip. Program memory 45 comprises, e.g., a mask ROM, and stores a control program for CPU 3 comprising a function program for realizing the basic functions, as shown in FIG. 12. Data memory 43 is used for storing various data, and comprises, e.g., an EEPROM.

Figure 13:
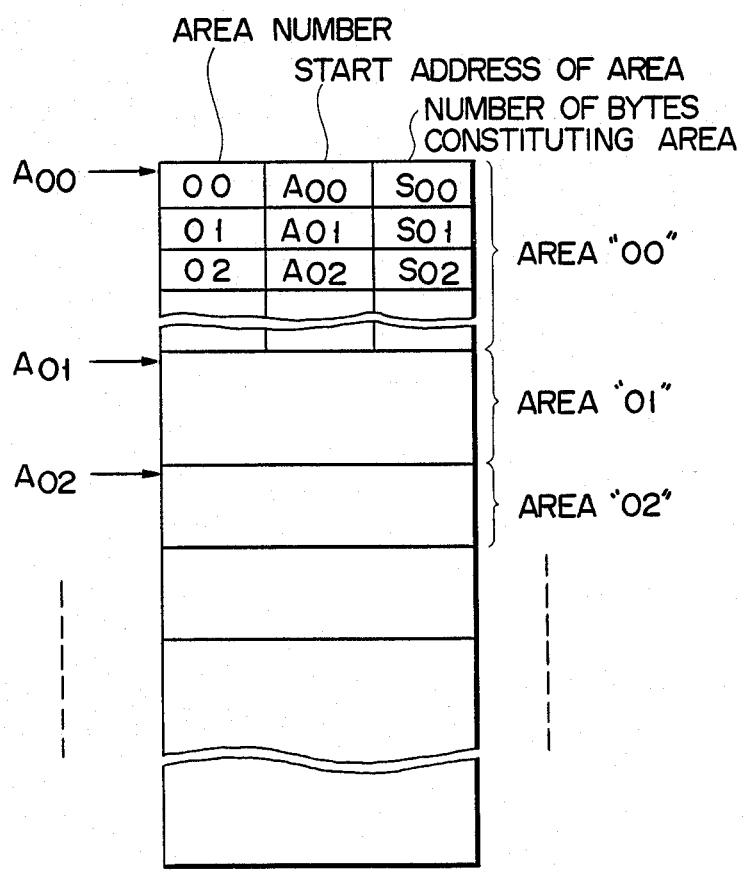
FIG. 13 is a format of a data memory.
Figure 15:
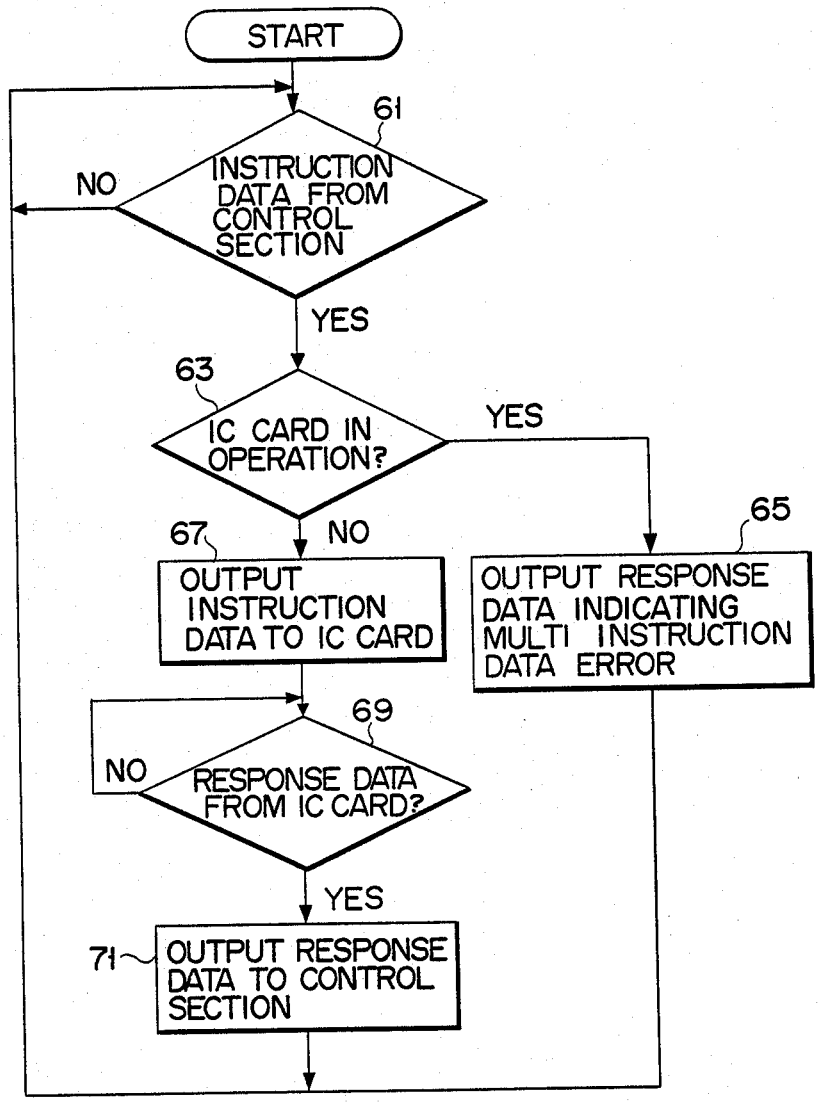
FIG. 15 is a flow chart for explaining the operation of a card reader/writer.

Data memory 43 is divided into a plurality of areas, as shown in FIG. 13, to which area numbers [00 through FF] are assigned. Area [00] stores the start addresses of the respective areas and the number of bytes constituting each area in correspondence with the area numbers. For example, the start address of area [02] is A02 address, and the number of bytes constituting area [02] is S02 bytes. Area [01] stores the start addresses of the respective function programs in correspondence with function codes, as shown in FIGS. 14A and 14B. For example, the start address of a program for realizing function code "B" is "bbb".

The operation of this embodiment will now be described. Card reader/writer 20 is operated in accordance with the flow chart shown in FIG. 15. In a normal state, CPU 3 awaits instruction data from CPU 11 (step 61). If CPU 3 receives the instruction data from CPU 11, CPU 3 checks in step 63 if IC card 1 is in operation. If YES is determined in step 63, CPU 3 outputs response data indicating a multiple instruction data error to CPU 11 in step 65, and again awaits the instruction data. However, if NO is determined in step 63, CPU 3 outputs the instruction data to IC card 1 in step 67, and awaits response data therefrom. If CPU 3 detects the response data from IC card 1 in step 69, it outputs response data to CPU 11 in step 71, and again awaits the instruction data.

The instruction data output from reader/writer 20 to IC card 1 has formats as shown in, e.g., FIGS. 16A and 16B. As shown in FIG. 16A, the instruction data can consist only of a function code, or as shown in FIG. 16B, it can consist of the function code and data.

IC card 1 is operated in accordance with the flow chart shown in FIG. 17. More specifically, in step 73, CPU 3 awaits instruction data from card reader/writer 20. If CPU 3 receives the instruction data from reader/writer 20, it executes the basic function in accordance with the input instruction data in step 75, outputs response data to reader/writer 20 in step 77, and then awaits the next instruction data. In this case, a function code included in the instruction data is added to the response data, thus taking precaution against sequence mismatching between itself and reader/writer 20.

Figure 18:
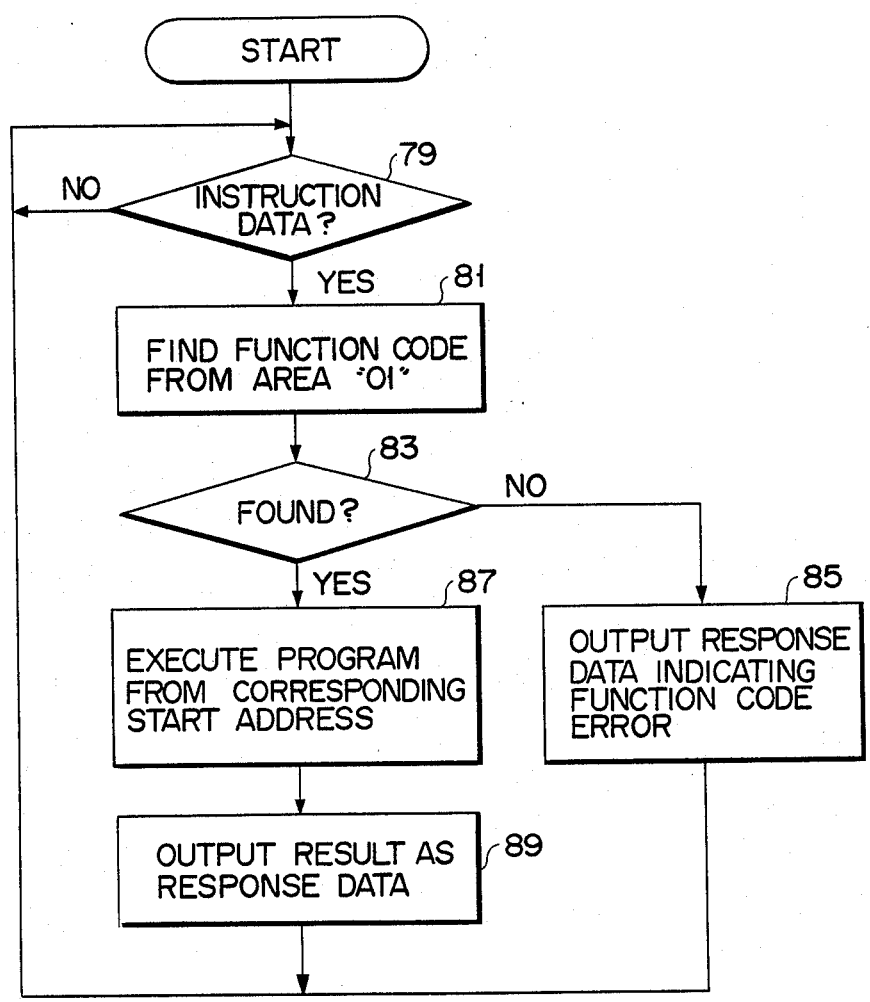

The detailed operation of IC card 1 will now be described with reference to the flow chart shown in FIG. 18. When CPU 3 receives instruction data (step 79), it extracts a function code added to the instruction data in accordance with a decode program in the control program stored in memory 45, in step 81. Thereafter, CPU 3 finds out the extracted function code from area [01] of data memory 43. If it is determined in step 83 that the extracted function code is not found, CPU 3 outputs response data indicating a function code error, in step 85, and awaits instruction data. If YES is determined in step 83, CPU 3 extracts the start address of the function program corresponding to the function code, in step 87, and control jumps to the function program. After the function program is executed, CPU 3 outputs the result as response data, in step 89, and then awaits the next instruction data.

For example, as in FIG. 14A, for instruction data with code "C" as a function code, a function program starting from address "ccc" is executed. If the function program starting from address "ccc" is a data write function program, function code "C" is a data write function code. In the correspondence table shown in FIG. 14B on the other hand, if the function program starting from address "ccc" is the data write function program, function code "D" serves as a data write function code. More specifically, when function programs are updated or added, the decode program need not be updated, and the correspondence tables shown in FIGS. 14A and 14B need only be updated or added. The correspondences between function programs and function codes can be updated only by updating the correspondence tables.

A third embodiment of the present invention will now be described with reference to FIGS. 19 through 24.

In this embodiment, program memory 45 comprises an EPROM or EEPROM, and stores a control program for CPU 3 storing function programs for realizing various basic functions. Data memory 43 is used for storing various data, and comprises, e.g., an EEPROM.

Figure 21:
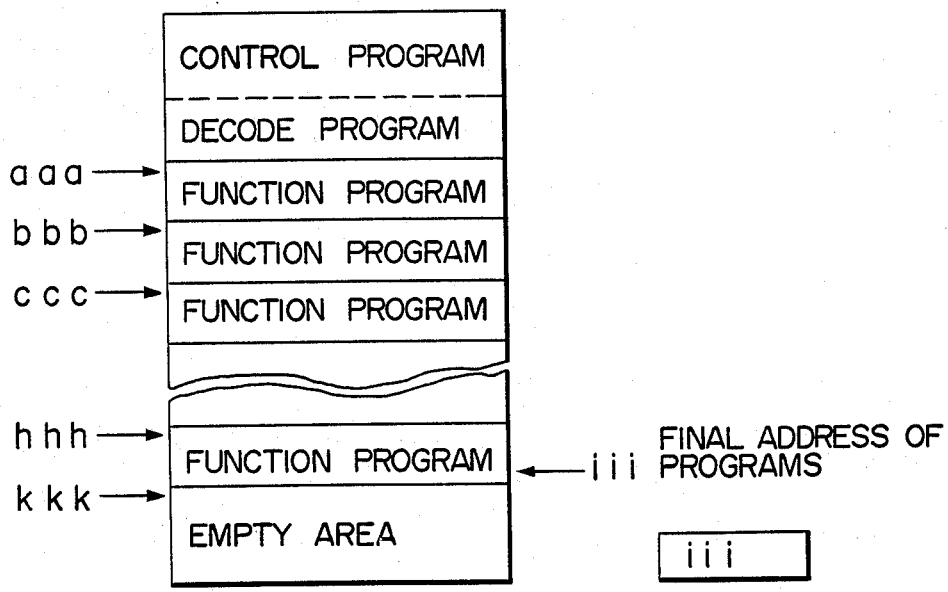
FIG. 21 is a format showing a state of the program memory storing an additional funciton program.

Area [00] shown in FIG. 13 stores the start addresses of the respective areas and the number of bytes constituting each area in correspondence with the area numbers. For example, the start address of area [02] is A02 address, and the number of bytes constituting area [02] is S02 bytes. Area [01] stores the start addresses of the respective function programs in correspondence with function codes. For example, the start address of a program for realizing function code "B" is "bbb". In addition, area [00] or [01] has an area for storing the final address of the function programs. In this embodiment, as shown in FIG. 21, the final address corresponds to "iii".

Figure 19:
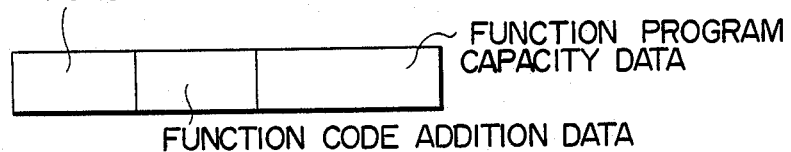
FIG. 19 is a format of function program addition instruction data.
Figure 22A:
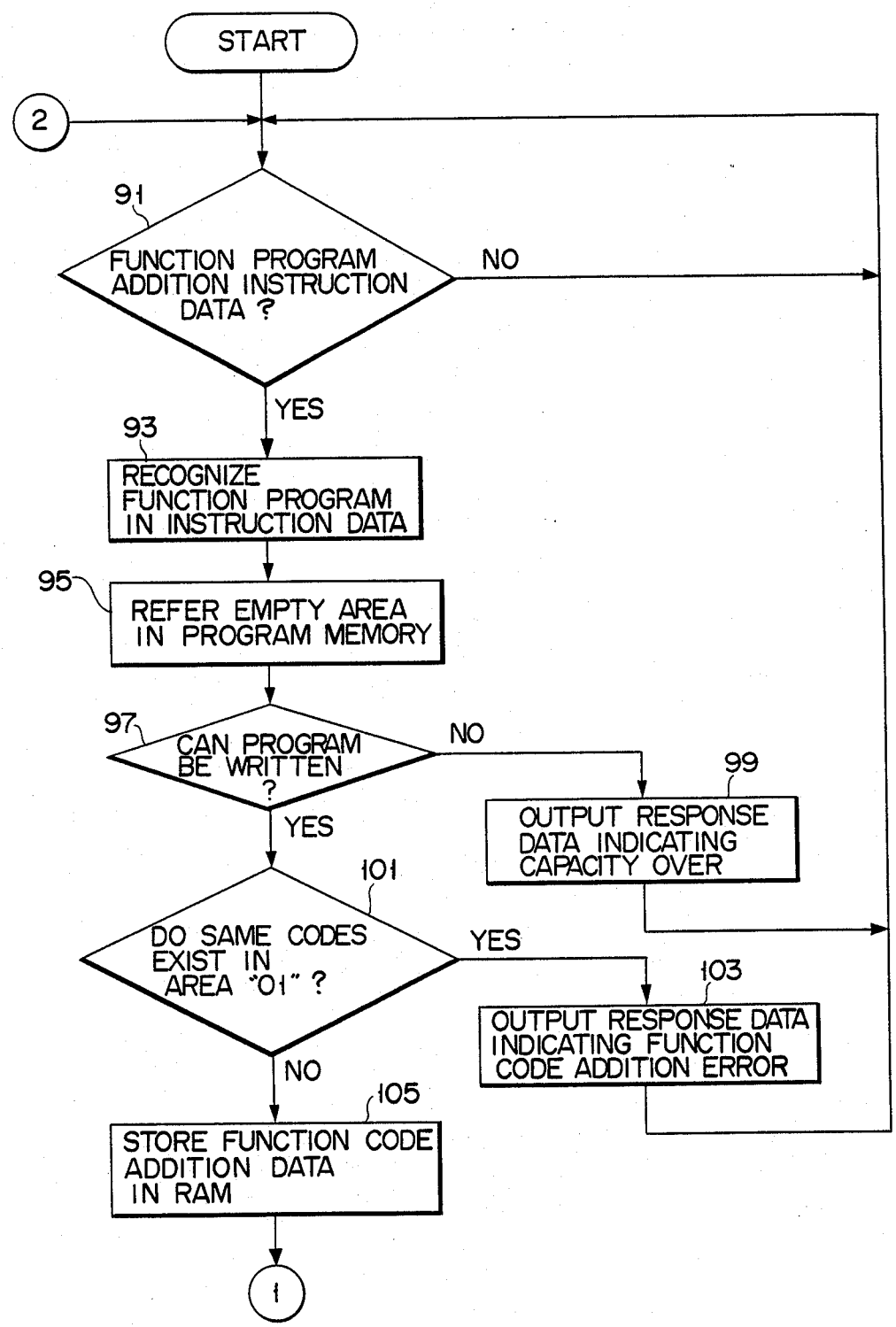
FIGS. 22A and 22B are flow charts for explaining an operation for storing an additional function program.
Figure 22B:
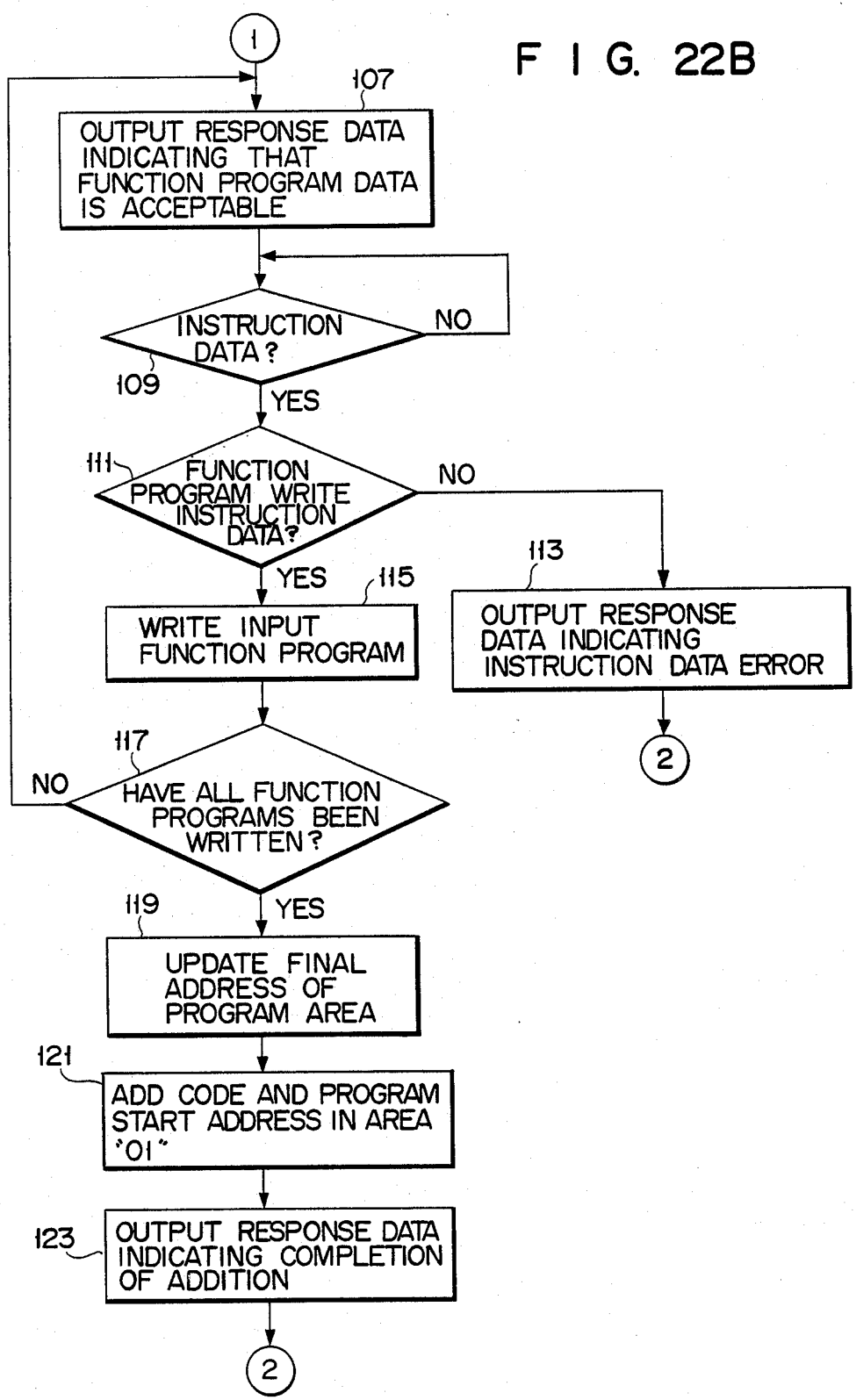

An operation for storing an additional function program by an external input operation will be described with reference to the flow charts shown in FIGS. 22A and 22B. In order to store function program, a function program addition instruction data having a format shown in FIG. 19 is input. The function program addition instruction data consists of a function program addition function code, function code addition data, and function program capacity data. If it is determined in step 91 that the function program addition instruction data is input, CPU 3 refers to the function program capacity data included in the instruction data to recognize the capacity of the function program which will be sent thereafter, in step 93. In step 95, CPU 3 refers to the capacity of an empty program area using the final address of the function programs in program memory 45. It is then checked in step 97 if the input function program can be stored. As a result, if NO is determined in step 97, CPU 3 outputs response data indicating capacity over (step 99), and then awaits the next instruction data. However, if YES is determined in step 97, CPU 3 extracts the function code addition data in the instruction data, and checks if an identical code is present in area [01] of memory 43, in step 101. If YES is determined in step 101, CPU 3 outputs response data indicating a function code addition error in step 103, and then awaits the next instruction code. If NO is determined in step 101, CPU 3 temporarily stores the extracted function code addition data in its internal RAM (Random Access Memory) in step 105, outputs the response data indicating that function program data is acceptable in step 107, and then awaits the function program write instruction data in step 109.

Figure 20:
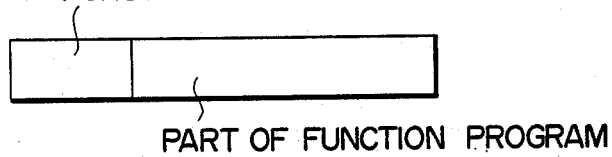
FIG. 20 is a format of function program write instruction data.

Thereafter, in step 111, a function program is input by means of single or a plurality of function program write instruction data consisting of the function program write function code and the function program, as shown in FIG. 20. If the input data is not function program write instruction data, response data representing response data is output in step 113 and control returns to step 91. However, if the input data is function program write instruction data, CPU 3 writes all the function program immediately after the function programs which are already stored in program memory 45, in step 115. If it is determined in step 117 that all the function programs have not yet been sent, the flow returns to step 107, and steps 107 through 117 are repeated. If YES is determined in step 117, CPU 3 recognizes the start and final addresses of the currently added function program with reference to the final address of the function programs in memory 45, in step 119. CPU 3 updates this final address as a final address of the function programs. In step 121, CPU 3 combines the function code addition data held in its RAM with the start address of the added function program, and additionally writes it into area [01] in memory 43.

Figure 23:
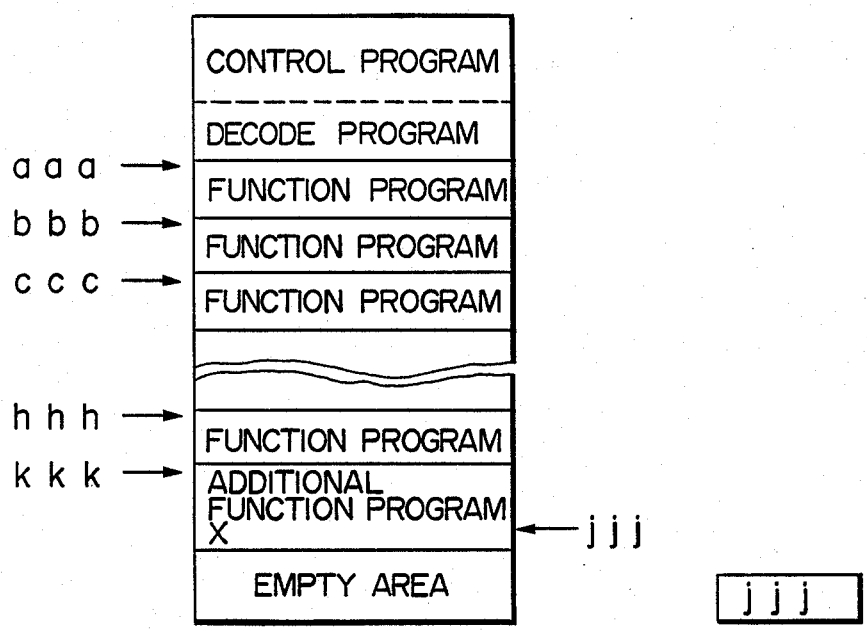
FIG. 23 is a format showing a state of the program memory storing an additional function program.
Figure 24:
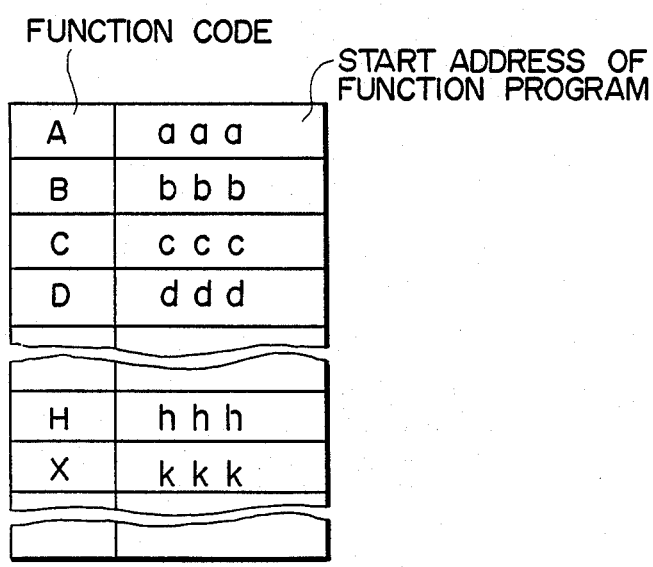
FIG. 24 is a table showing the correspondence between function codes and start addresses of the function programs.

For example, if function program X is additionally stored, a function code corresponding thereto is x. FIG. 23 shows the state of program memory 45 in which the function program is stored in accordance with the sequence described above, and FIG. 24 shows the state of area [01] in memory 43. CPU 3 outputs the response data indicating completion of addition to CPU 11, and the flow returns to step 91. When the function program is stored as described above, it can be executed in accordance with the sequence shown in FIG. 18.

In the first embodiment, texts are distinguished from each other by checking if a flag for the user or system is set. The present invention is not limited to this, and a specific code of a plurality of bits can be used. The start code of the text, the order of fields in the text, a format and the like thus can be changed.

In the above embodiments, the data memory comprising an unerasable PROM is divided into the system program area, the user program area, and the data area. However, it can comprise an EEPROM to allow erasing of the content of the data area by the system program. In addition, the respective areas can be constituted by individual memory chips. In this case, the system program and user program are stored in memory chips comprising PROMs, and data is stored in a memory chip comprising an EEPROM.

The IC card can comprise a display section and a keyboard, and an addition function can be executed by the card itself. In the above embodiments, the IC card has been exemplified. However, the present invention is not limited to this, but can be any electronic device having a data memory and a control element and performing external data input/output operation. The shape of the electronic device is not limited to a card-like shape, but can be another shape, e.g., a rod-like shape.

In the third embodiment, a case has been described wherein the control element, the data memory, and the program memory are constituted by a single IC chip. They need not be constituted by a single chip, but can be constituted by individual IC chips.

The start addresses of programs corresponding to the respective function code may be obtained by storing the respective start addresses of the programs corresponding to the function codes in separate storage areas and preparing a table in which the addresses indicating the storage areas correspond to the function codes, respectively.

What is claimed is:

1. A portable electronic device detachably connected to an external host system, comprising:
    memory means for storing a system program and a user program;
    command text generating means for generating a command text containing data indicating whether a text transmitted to the portable electronic device from said external host system is used to write the system program or the user program into said memory means, said command text having a start code field, a text length field, a command field, and a check code, said command field containing a specified bit which indicates whether the text transmitted to the portable electronic device from said external host system is used to write the system program or the user program into said memory means; and response text generating means for generating a response text containing data indicating whether a text transmitted from the portable electronic device to the host system is used to write the system program or the user program into said memory means.

2. A device according to claim 1, wherein said response text has a start code field, a text length field, a command field, a status field, a data field, and a check code, said command field containing a specified bit which indicates whether the text transmitted from the portable electronic device to the host system is used to write the system program or the user program into said memory means.

3. A portable electronic device detachably connected to an external host system, comprising:
program memory means for storing function programs;
data memory means for storing the start addresses of the function programs stored in said program memory means along with the corresponding function codes of the function programs;
decoding means for receiving function codes from said host system;
outputting means for outputting the start addresses of the function programs which correspond to the received function codes;
program-executing means for receiving function codes from the host system;
executing means for executing the function programs from the start addresses output by said outputting means; and
function program registering means for registering a function program into said program memory means in response to function program write instruction data supplied from the host system.

4. A device according to claim 3, wherein said data memory means further stores the end addresses of the function programs, said function program write instruction data including a function code field containing the function code representing a function program to be written into said program memory means, a field in which the function program is written, and a field in which the size of the function program is written, said function program registering means determining whether it is possible to write a function program into said program memory means based on the end addresses of the function programs stored in said data memory means and the size of the function program to be written into said program memory means.

5. A device according to claim 3, wherein said function program registering means registers a function program into said program memory means only when said function program registering means determines that it is possible to write a function program into said program memory means.

6. A device according to claim 3, wherein said function program registering means determines whether a function program to be written into said program memory means is identical with a function program already stored in said program memory means, and registers the function program into said program memory means if it is different from any function program already stored in said program memory means.

7. A device according to claim 3, wherein said data memory means has a plurality of areas, one area being used for storing the start addresses of the function programs and the data representing the number of bits which can be stored in the corresponding area.

8. A device according to claim 3, wherein said data memory means stores a table of the function codes of the function programs and the addresses at which these function programs are stored.

* * * * *